Jan. 12, 1971  S. D. HOLMES  3,554,049
REMOTE CONTROL REAR VIEW MIRROR
Filed Jan. 22, 1969  2 Sheets-Sheet 1

INVENTOR.
STANNARD D. HOLMES
BY
ATTORNEY

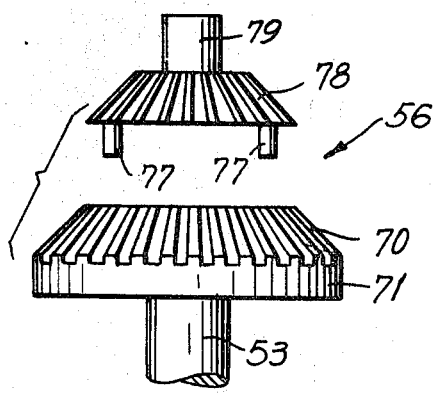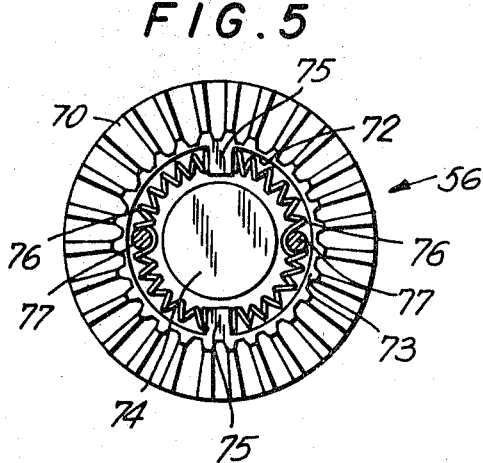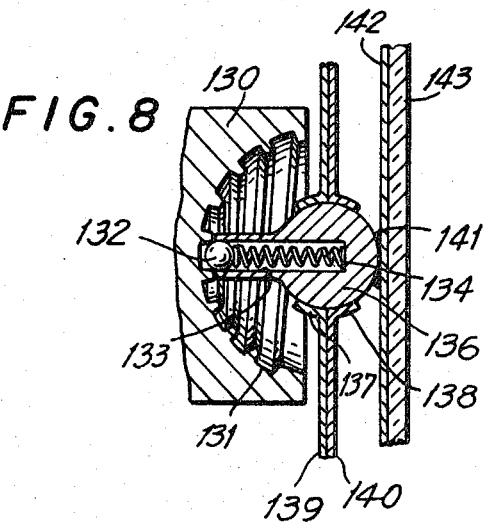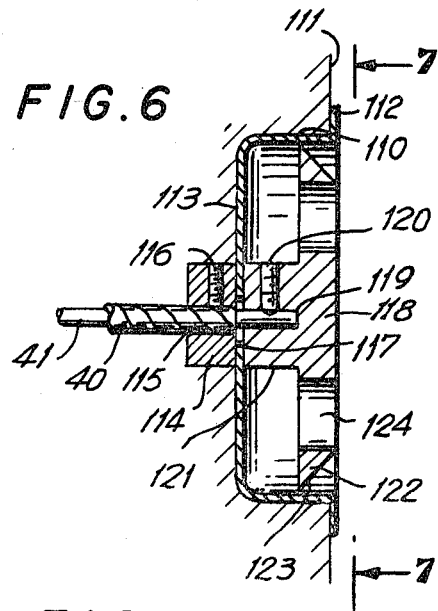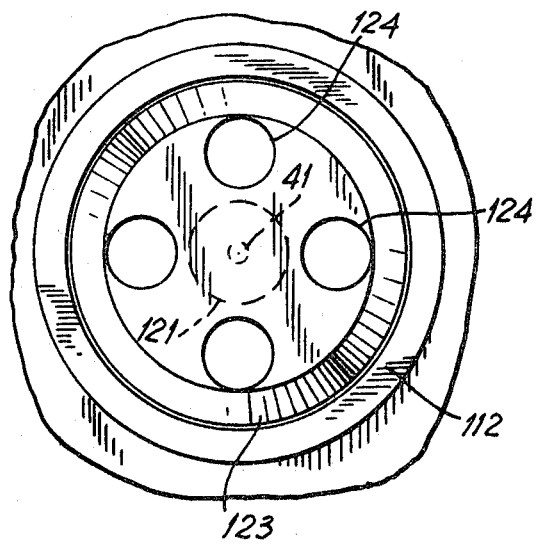

United States Patent Office 3,554,049
Patented Jan. 12, 1971

---

3,554,049
REMOTE CONTROL REAR VIEW MIRROR
Stannard D. Holmes, P.O. Box 331,
Naranjito, Puerto Rico
Filed Jan. 22, 1969, Ser. No. 793,018
Int. Cl. F16c 1/10; F16h 55/18
U.S. Cl. 74—501                            10 Claims

ABSTRACT OF THE DISCLOSURE

The disclosure relates to a remote control rear view mirror externally mounted on automobiles and trucks, controlled from the inside of the driver's compartment of the vehicle by a flexible cable having a flush mounted dial or knob inset in the door next to the driver. The movement of the mirror is controlled through gearing and through a face cam.

DESCRIPTION OF THE INVENTION

The present invention relates to a remote control rear view mirror connected to a flush type dial or knob inset in the door next to the driver.

It is among the objects of the present invention to provide a compact readily installed, readily repaired and reilable remote control rear mirror for external mounting on automobiles, trucks and the like, which can be readily manipulated from the interior of the vehicle and which will not require any particular special effort by the user of the vehicle.

Another object is to provide a novel compact effective remote control mirror, which can be readily adjusted for desired rear vision from the interior of the vehicle without requiring the user thereof to remove himself from the vehicle for such adjustment and which will hold its adjustment without tending to be displaced by external windage or other external forces.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the preferred form of the invention the remote control mirror is controlled in respect to its adjusting movement from the inside of the motor vehicle by a flexible cable which is connected to a flush type dial or knob in the door next to the driver.

The movement of the mirror is actuated through the flexible cable to a lower level gear, which is engaged with a mating gear. The mating gear has on its side opposite the teeth a concave surface on which is cut a tight spiral groove acting as a face cam. The mirror glass is attached to the carrier, which in turn is mounted on a ball or similar element.

The ball is held by a pair of socket bearing plates with the ball being allowed limited movement, thus permitting the mirror similar movement in all directions in at least two axes. On the opposite side of the ball from the mirror is a drive pin, which rides in the cam spiral groove on the face of the upper gear. As the gears rotate, the drive pin positions the mirror in the desired location. The spherical ball may have a ball connection instead of a pin connection of the spiral groove, with the ball being pressed by means of a spring.

The back lash between the baffle gears may be eliminated by a two-piece drive baffle gear, with upper and lower sections forced in opposite directions by springs, thus taking up the clearance between the drive and the driven gear.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a separated view showing the double gearing arrangement.

FIG. 5 is a fragmentary transverse sectional view taken upon the line 5—5 of FIG. 2.

FIG. 6 is a transverse vertical fragmentary sectional view showing the mounting of the interior of the vehicle.

FIG. 7 is a front elevational view taken upon the line 7—7 of FIG. 6.

FIG. 8 is a transverse sectional view showing the alternative form of drive using a ball.

Referring to FIG. 1, there is shown an automotive vehicle A of the passenger type, having the adjustable rear view mirror device of the present invention B mounted upon the right fender C and connected by the flexible cable D enclosed within the body of the car to the manually actuated device E. As shown in FIG. 2, the device has a lower hollow preferably cast foot member 20 having the bottom portion 21 mounted directly upon the top face 22 of the fender C. This foot member may be soldered at 23 and 24 to the semi-spherical housing 25, which faces toward the driver's position F in the automotive vehicle.

Figure 1:
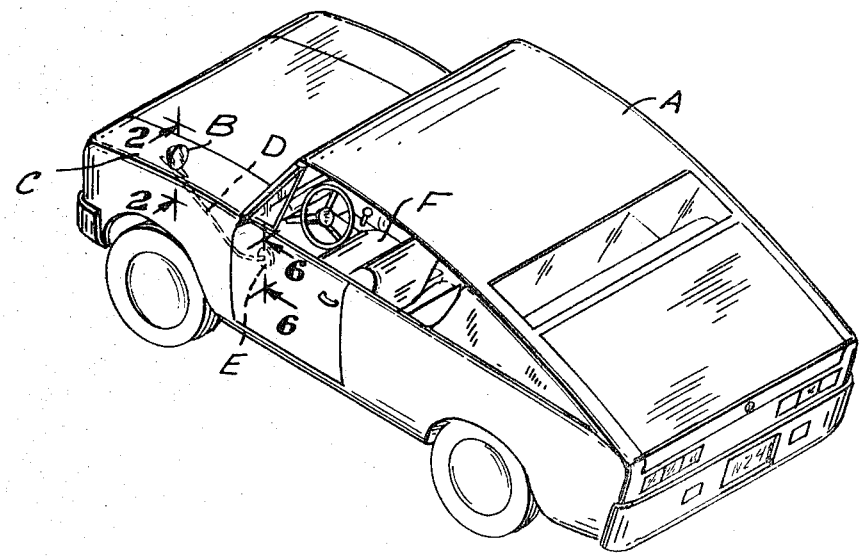
FIG. 1 is a top perspective view of a gear showing the mirror mounted in position.

The mirror G is provided with an enclosure having a back portion 26 and the over-turned edge portions 27, leaving the front 27 of the mirror free. The cable D has a twisted housing 40 and an interior actuating cable 41. This shield or housing D extends upwardly through an opening 43 in the base 21 of the foot member 20. It then extends upwardly through the vertical mounting member 44 having the central opening 45 and having a lower screw sleeve 46 mounted by soldering 47 to the interior face 48 of the foot member 20.

The upright 44 extends through the lower portion of the shield 25 through the opening 49 and it carries the top holder member 50 at the soldered connections 51. This member 20, together with the upright 49, has the recess 52, which receives the stud shaft 53, to which the end 54 is attached by the set screw 55. This stud shaft 54 drives the split bevel gear 56. This bevel gear is shown best in FIGS. 4 and 5.

In FIG. 4 there is shown the lower spiral gear element 70 having the lower cylindrical portion 71. The top view 5 of the lower gear 70 shows the recess 72 formed between the outer portion 73 and the interior stud 74. The member portion 73 has the inwardly projecting blocks 75, which contact and hold in position the coiled springs 76 which are semi-circularly arranged on each side of the recess 72.

The pins 77 are mounted on the top unit 78, which fits down upon the top face of the gear 70, which has an upwardly projecting stud 79.

Figure 2:
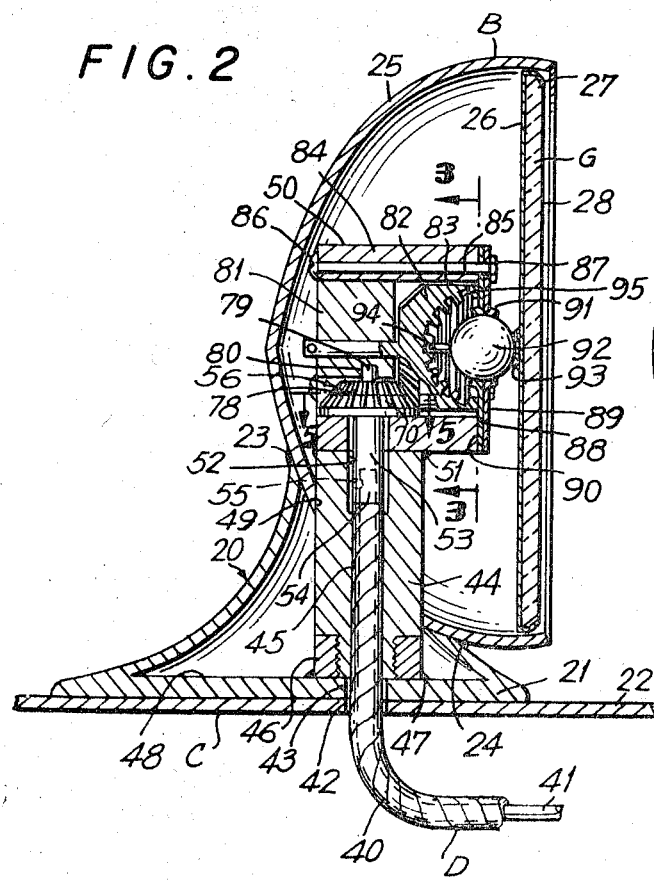
FIG. 2 is a transverse vertical sectional view upon the line 2—2 of FIG. 1, upon an enlarged scale as compared to FIG. 1.

As shown in FIG. 2, the stud 79 fits into the recess 80 in the block 81. These combined gears 70 and 78 mesh with the spur gear 82, which fits within the opening 83.

It will be noted that the opening 83 is formed in the outer sleeve or enclosure 84, which has the through bolts 85 with the filister heads 86 and the nuts 87 which hold the plates 88 and 89 in position against the face 90 of the enclosure structure 84. The inside portions of the plates 88 and 89 have the out-turned portions 91, which form a bearing for the ball 92, which is mounted at 93 on the back of the mirror G.

The ball has a projecting pin 94 which rides in the spiral slot 95 on the inside face 96 of the spur gear element 82.

Referring to FIGS. 6 and 7, there is shown the cup 110 on the door or inside structure 111 of the automotive vehicle, which has the out-turned flanges 112 and the interior enclosure or base 113. This cup has a hub portion 114 which receives the end 115 of the closure 40 for the cable 41. The closure 115 is held in position by means of a set screw 116, while the cable extends through the opening 117 into the body of the manually actuated element 118, as indicated at 119. The set screw 120 holds the inner end of the cable 41 in position in the hub 121. The hub 121 has an actuator 118 with the bevel edge portions 123 and the openings 124 which permit the fingers to engage in said openings and turn the structure 122, as well as the cable 41.

By inserting the finger in one of the openings 124 and turning the cable 41 through the hub 121, the lower gear 56, composed of the joint gears 70 and 78, is rotated, turning the spur gear 82 and at the same time causing the pin 94 to turn in the spiral groove 85, adjusting the position of the gear G to the desired position to give the driver of the automotive vehicle the proper rear view he desires.

Figure 3:
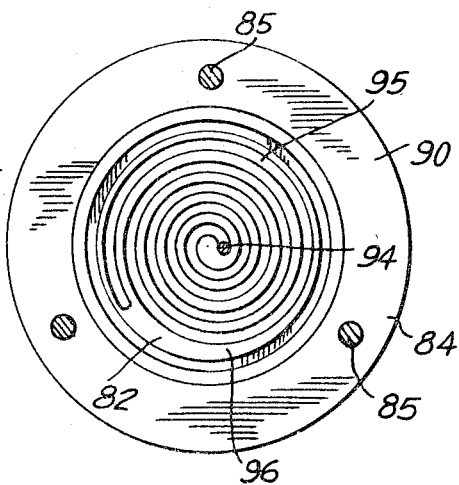
FIG. 3 is a transverse vertical section view upon the line 3—3 of FIG. 2.

In the alternative device of FIG. 8 the spiral gear body 130 is provided with a spiral groove 131 similar to the groove 135 of FIG. 3, which receives the follower ball 132. The follower ball 132 fits in the recess 133 and it is spring pressed by the coil spring 134 into the groove 131. The ball 136 bears within the out-turned flange portions 137 and 138 of the plates 139 and 140, which correspond to the plates 88 and 89 of FIG. 2. The ball 136 is mounted at 141 on the back 142 of the adjustable mirror 143.

It is thus apparent that the applicant has provided a remote control adjustable mirror for external mounting in an automotive vehicle, which may be controlled from adjacent the door or any other position within the automotive vehicle. Thus flush type dial or knob is shown on the side of the door but it may be positioned on the dashboard or other positions. The movable cable extends through to the gears which actuate the mirror and the gear toward the mirror has an internal semi-spherical face which is provided with a spiral groove in which either a ball 132 or pin 94 fits to adjust the mirror to the proper position.

The double bevel gear prevents backlash inasmuch as the springs 76 will take up any clearance. The lower sections of the drive gear are forced in opposite directions by the springs 76, so that there will be no loose motion between the drive and the driven gear.

As many changes could be made in the above remote control rear view mirror, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An adjustable plane, remote control rear view mirror for external mounting on trucks and automobiles, comprising a rotatable actuator mounted on the interior of the vehicle adjacent and accessible to the driver, a flexible drive cable extending forwardly from the actuator and driven thereby, an adjustable plane rear view mirror mounting in the adjacent front side of the vehicle, a vertical axis gear being horizontally split and having an anti-backlash arrangement between the split portions of the vertical axis gear, a horizontal axis meshing gear meshing with the vertical axis gear, said vertical axis driven by the forward end of said cable, a drive plate driven by one of said gears having a continuous spiral drive groove on its drive face, a rearwardly facing mirror, a universal bearing element projecting from its rear side and a bearing enclosure for said bearing element and a connection to ride in said groove and connected to said element.

2. The mirror of claim 1, the upper horizontal split gear having a flat lower face having depending studs on diametrically opposite sides thereof inside of the outer edges thereof and the upper flat face of the lower split gear having a vertical axis having a circular groove therein, into which said studs downwardly project and also having inwardly extending stop members spaced midway between said studs and springs positioned between said studs and said stop members, forcing the upper and lower split portions of the conical gear in opposite directions and thereby taking up any clearance between the drive and the split driven gear.

3. The mirror of claim 1, the drive plate having a hemispherical recess in which said spiral drive groove is positioned and a spring-pressed ball riding in said spiral groove.

4. The mirror of claim 1, said drive plate having a hemispherical face on the opposite side from the horizontal axis spiral gear and a spiral groove having a square cross-section positioned on said hemispherical face.

5. The mirror of claim 1, said actuator consisting of an open disc and a cup mounted in the side of the automotive vehicle interior receiving said disc, said disc being turnable by the driver of the vehicle.

6. The mirror of claim 1, said rear view mirror consisting of a plain circular mirror and an encircling hood, within which the mirror may be adjusted both vertically and horizontally.

7. The mirror of claim 1, said meshing bevel gears consisting of a split pair of gears connected to the vertical end of the cable and said split end being forced together by a spring so as to take up any lost motion.

8. The mirror of claim 1, said drive plate consisting of a semi-spherical recess on one of the gears and said groove being on the interior of said recess.

9. The mirror of claim 1, said connection consisting of a pin extending rearwardly from the universal bearing element.

10. The mirror of claim 1, said connection consisting of a spring-pressed ball.

References Cited

UNITED STATES PATENTS

| | | | |
|---|---|---|---|
| 2,917,972 | 12/1959 | Bonaguro | 74—501 |
| 2,996,929 | 8/1961 | Lazarowicz | 74—409 |
| 3,359,819 | 12/1967 | Veillette et al. | 74—409 |

FRED C. MATTERN, JR., Primary Examiner

W. S. RATLIFF, JR., Assistant Examiner

U.S. Cl. X.R.

74—409